S. C. HILLS.
EGG BEATER.
APPLICATION FILED APR. 29, 1921.
1,386,405.
Patented Aug. 2, 1921.
2 SHEETS—SHEET 2.
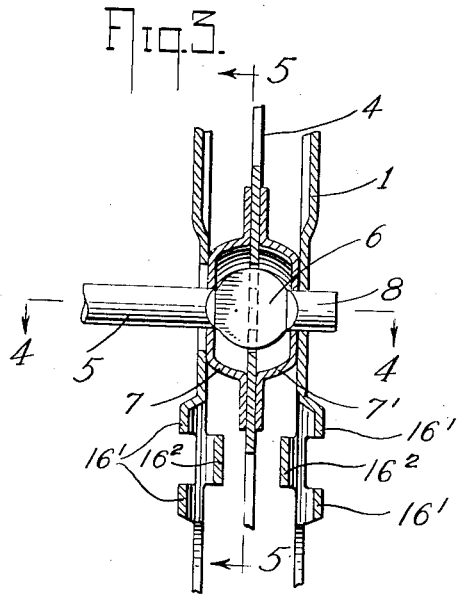
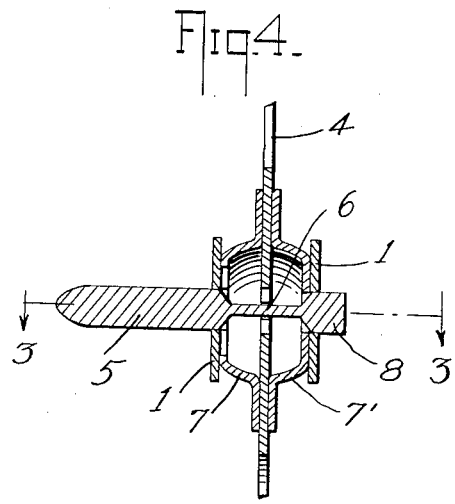
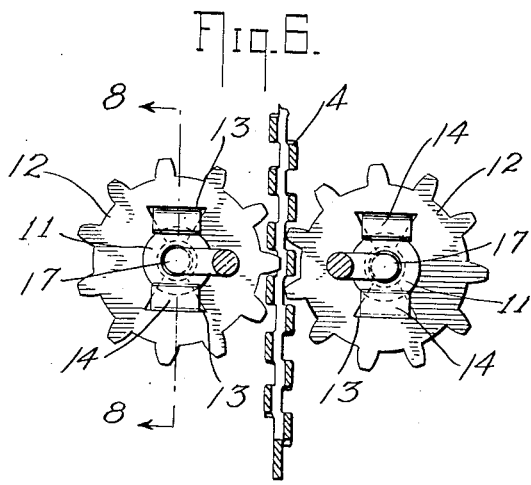
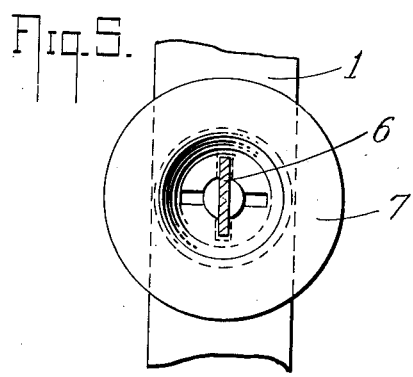
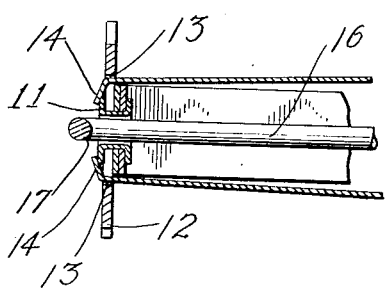
Inventor
S. C. HILLS.
By his Attorneys

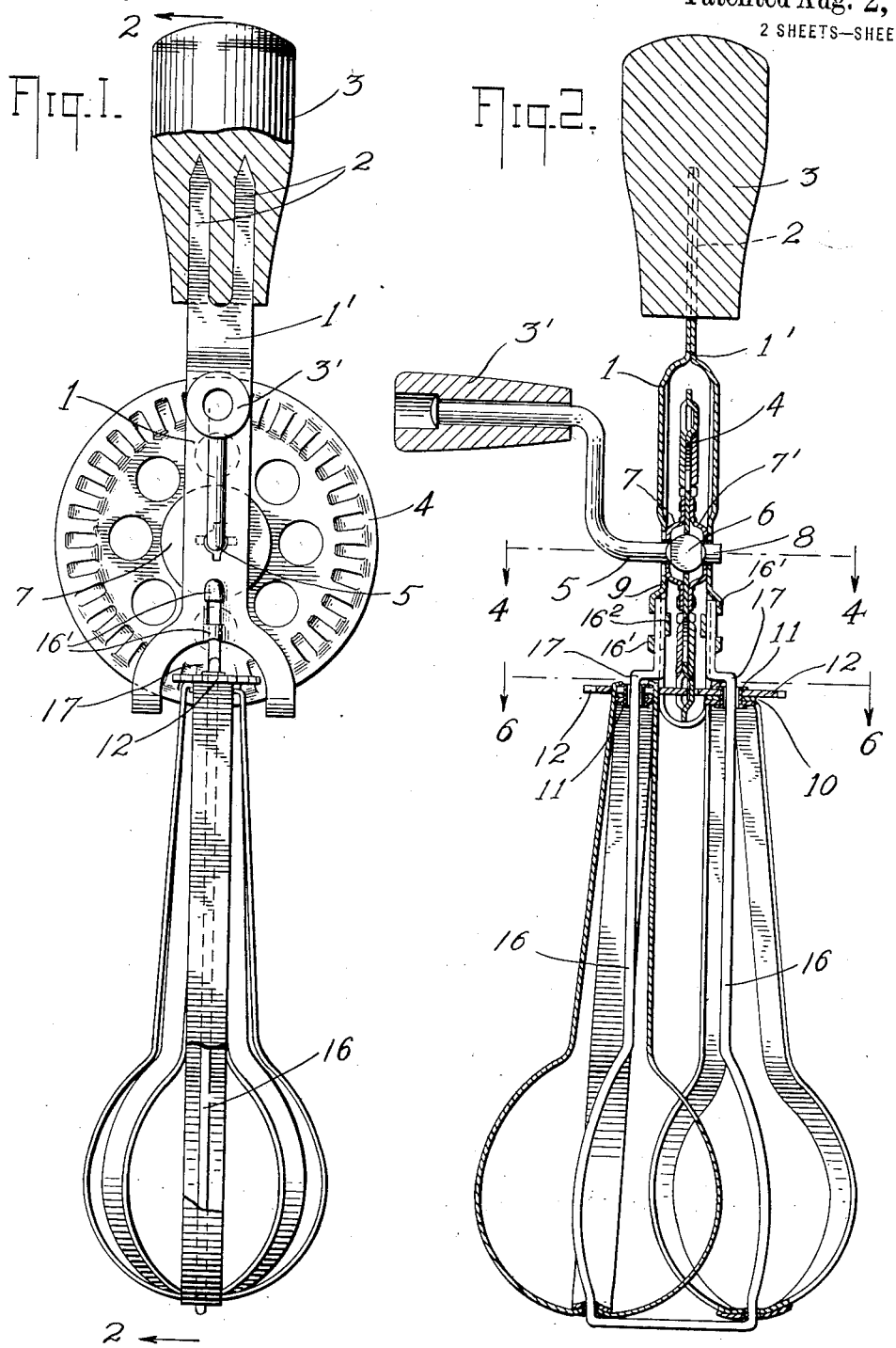

UNITED STATES PATENT OFFICE.

SIDNEY C. HILLS, OF TORRINGTON, CONNECTICUT, ASSIGNOR TO THE TURNER & SEYMOUR MANUFACTURING COMPANY, OF TORRINGTON, CONNECTICUT, A CORPORATION OF CONNECTICUT.

EGG-BEATER.

1,386,405.  Specification of Letters Patent.  Patented Aug. 2, 1921.

Application filed April 29, 1921. Serial No. 465,419.

*To all whom it may concern:*

Be it known that I, SIDNEY C. HILLS, a citizen of the United States, residing at Torrington, county of Litchfield, State of Connecticut, have invented a certain new and useful Improvement in Egg-Beaters, of which the following is a full, clear, and exact description.

My invention relates to a new and improved egg beater of the rotating float type and has for its object to provide a new and improved means for connecting the driving gear to the shaft of the handle; to provide a new and improved means for connecting the floats to the gears driven by the handle; to provide a new and improved yoke and handle secured thereto so as to hold the parts of the yoke in position, and to provide a rotary float egg beater having no cast iron parts.

The following is a description of an embodiment of my invention, reference being had to the accompanying drawings, in which, Figure 1 shows a side elevation of an egg beater embodying my invention, portions being broken away;

Fig. 2 shows a longitudinal section on the line 2—2, Fig. 1;

Fig. 3 shows an enlarged sectional detail of a portion of the egg beater adjacent to the hub of the drive wheel, the section being on the line 3—3, Fig. 4;

Fig. 4 is a section on the line 4—4, Fig. 3;
Fig. 5 is a section on the line 5—5, Fig. 3;
Fig. 6 is a section on the line 6—6, Fig. 2;
Fig. 7 is a detail; and
Fig 8 is a section on the line 8—8, Fig. 6.

Referring more particularly to the drawings, 1 is the yoke of an egg beater, having two arms each provided with two prongs 2, which are forced into holes drilled in the handle 3 so as to be securely held therein. The two halves of the yoke are spot welded at 1' near the wooden handle so as to be held together by this means as well as by the handle. The provision of the double prong engaging the wooden handle 3 makes a strong connection which is not liable to become loosened. Below the prongs 2 the sides of the yoke are separated and between them is mounted the drive gear 4 which, as shown in my Patent No. 1,206,327, dated Nov. 28, 1916, has radial teeth projecting alternately from opposite surfaces and having their opposite ends integrally connected. 5 is the shaft of the handle, which is made of round wire and has adjacent to its end a portion 6 formed by flattening the wire in a suitable press and thereby forming two wings thereon as shown in Fig. 5. The gear 4 is composed of a central plate and two caps or dished washers 7—7'. The cap 7' has a hole fitting the end 8 of the shaft 5, while the center of the gear 4 and the cap 7, as well as the member 9 of the frame, has a winged hole as shown in Figs. 1 and 5, the central portion permitting the passage of the round end 8 of the wire, while the winged portion permits the passage of the wings 6 on the shaft.

In assembling this construction the cap 7' is first spot-welded in place upon the central plate of the gear and thereupon the gear and the cap 7 are placed between the arms of the frame 1, the wings in the holes in the gear, plate, cap 7 and limb 9 of the frame being in line. Thereupon the plate 7 is turned angularly relatively to the plate of the gear 4 so that the wings in the cap 7 and in the plate are out of alinement. The cap 7 is then spot-welded or otherwise secured to the plate. The shaft of the handle 5 is thus securely fastened to the gear 4, and, together with the gear, is mounted in the U-shaped frame 1. The flattened portion 6 should be of such dimensions as to extend from the inner surface of the cap 7 to the inner surface of the cap 7' so as to hold the handle from longitudinal movement.

The floats of this beater are each of the double type. One float has its ends bent so as to be horizontal as shown at 10 in Fig. 2. These ends are perforated and the eyelet 11 is passed through the same and through a perforation in the pinion 12 so as to secure this float to the pinion. The other float has its ends passed through openings 13 in the pinion 12 and the tips 14 are then bent over so as to hold that float to the pinion 12. Shoulders 15 (Fig. 7) are provided, which engage the under sides of the pinions 12. The openings 13 preferably have their sides inclined as shown so as to be more or less triangular. The edges of the arms of the floats A at points adjacent to the pinions 12 are closely adjacent to the inner surfaces of the floats B, and the floats B, since they are held against axial movement relatively to the pinions 12 by having their upper end passing through holes therein, thereby hold the floats A from axial movement relatively to those pinions. The floats A and B, together with the pinions 12, are mounted upon a U-shaped wire 16 as shown in Fig. 2. The upper ends of this wire are inserted in sockets formed by struck up loops 16', 16² and soldered thereto so as to be securely fixed to the sides of the U-shaped frame 1. The beater above described, with the exception of the crank-shaft 5, bearing 16, and handles 3—3' is entirely made of sheet metal. It is strong and durable and easy in action and inexpensive to manufacture.

The beater is of the central drive type, the teeth on the driving gear 4 being engaged on opposite sides by the pinions 13 so that the counter-thrust upon the driving wheel is balanced and the danger of the beater becoming inoperative on account of wear is very largely eliminated.

In order to prevent the pinions 12 from rising above a predetermined point, the wire 16 is bent abruptly at the points 17 as shown in Fig. 2, thus providing a shoulder upon the wire 16 which restrains the upward movement of the floats and pinions 12.

As will be evident to those skilled in the art, my invention permits of various modifications without departing from the spirit thereof or the scope of the appended claims.

What I claim is:

1. In an egg beater, the combination of a round shaft having a locally flattened winged portion, a wheel and a dished washer, each having a winged opening adapted to pass over both the round and flattened portions of said shaft, and a second dished washer having a hole adapted to receive the round portion of said shaft, said washers being secured to said wheel and located so that said winged openings are out of alinement with one another.

2. In an egg beater, the combination of a round shaft having a locally flattened winged portion, a wheel and a dished washer, each having a winged opening adapted to pass over the round and flattened portions of said shaft, and a second dished washer having a hole adapted to receive the round portion of said shaft, said washers being secured to said wheel and located so that said winged openings are out of alinement with one another, the distance between the inner surfaces of said dished washers being substantially the same as the longitudinal dimensions of the wings on said shaft.

3. In an egg beater, the combination of a round shaft having a locally winged portion, a yoke having in both wings openings adapted to receive said round shaft, one at least of said openings being winged so as to also pass said winged portion, a wheel, and a dished washer having similar winged openings angularly displaced relatively to one another and a second dished washer having a hole adapted to receive the round portion of said shaft, said washers being secured to said wheel.

4. In an egg beater, the combination of a sheet metal pinion having a central perforation and having parallel slots on opposite sides of said perforation and extending through said pinion in a direction parallel to its axis, and a looped float having its ends extending through said slots and secured therein, and having shoulders adjacent to said ends engaging said pinion.

5. In an egg beater, the combination of a sheet metal pinion having a central perforation, a beater float having alining openings in its ends, a hollow rivet passing through said openings and perforations and securing said float to said pinion, said pinion having parallel slots on opposite sides of said perforation, and a second float at an angle to said first looped float and having its ends extending through said slots and secured therein, and shoulders adjacent to said ends engaging said pinion.

6. In an egg beater, the combination of a sheet metal pinion having a central perforation, a beater float having alining openings in its ends, a hollow rivet passing through said openings and perforation and securing said float to said pinion, said pinion having parallel slots on opposite sides of said perforation, and a second float at an angle to said first float and having its ends extending through said slots and secured therein, the inner faces of said second float being adjacent to the edges of said first float at points in close proximity of said pinions.

SIDNEY C. HILLS.